No. 798,956. PATENTED SEPT. 5, 1905.
P. E. GOOD.
THRESHING MACHINE.
APPLICATION FILED JAN. 21, 1905.

3 SHEETS—SHEET 1.

Witnesses
Frank A. Fahle
J. A. Walsh

Inventor
Peter E. Good
By
Bradford Hood.
Attorneys

No. 798,956. PATENTED SEPT. 5, 1905.
P. E. GOOD.
THRESHING MACHINE.
APPLICATION FILED JAN. 21, 1905.
3 SHEETS—SHEET 2.
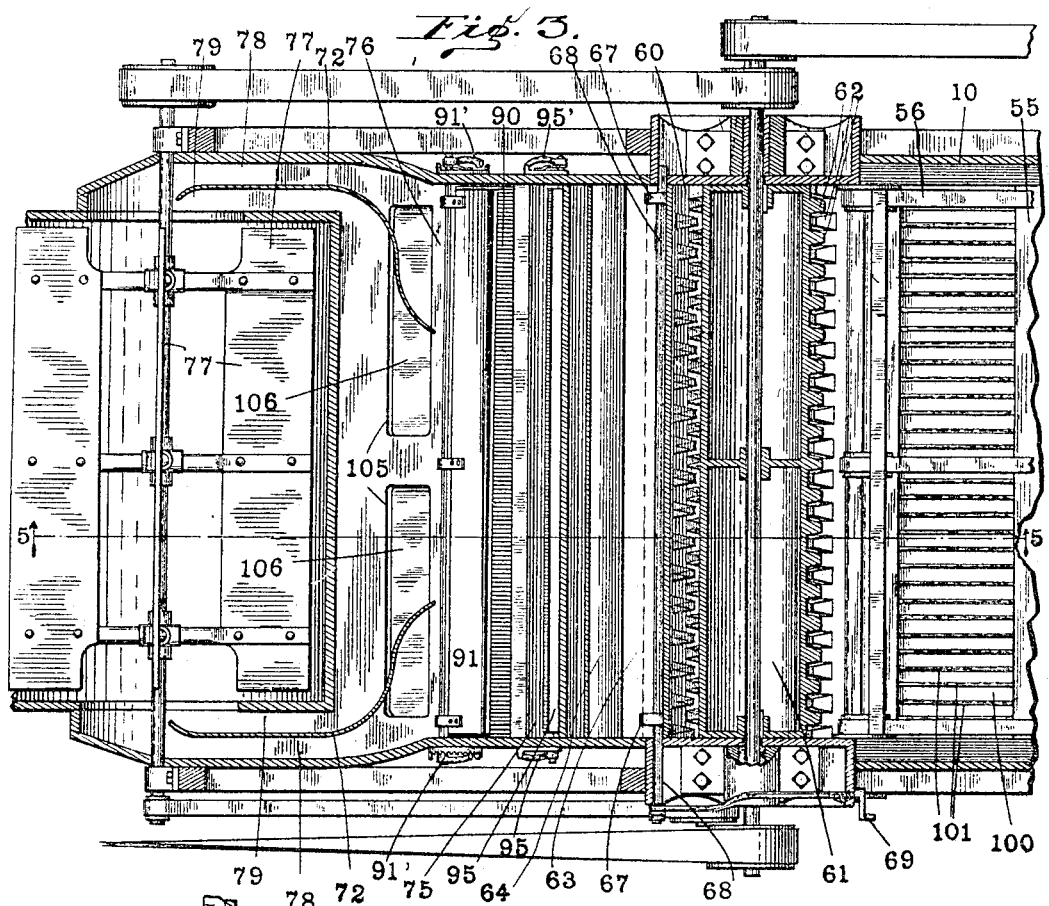
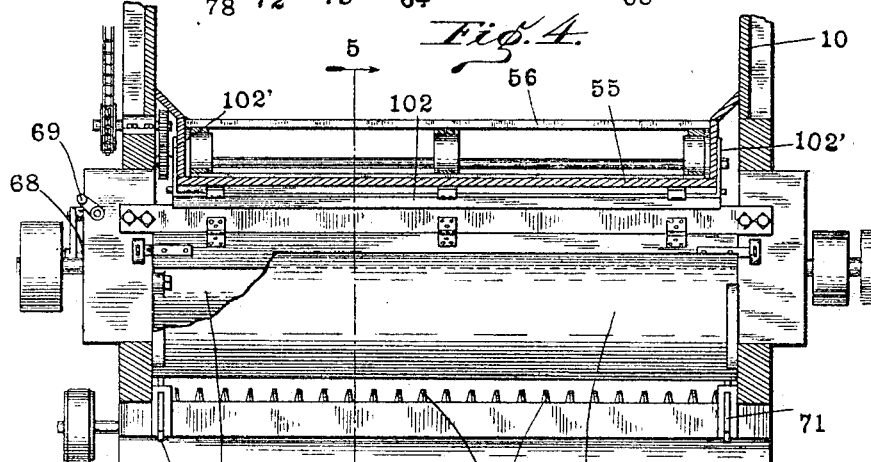
Witnesses
Frank A. Fahle
J. A. Walsh
Inventor
Peter E. Good
By
Bradford Hood
Attorneys No. 798,956. PATENTED SEPT. 5, 1905.
P. E. GOOD.
THRESHING MACHINE.
APPLICATION FILED JAN. 21, 1905.
3 SHEETS—SHEET 3.
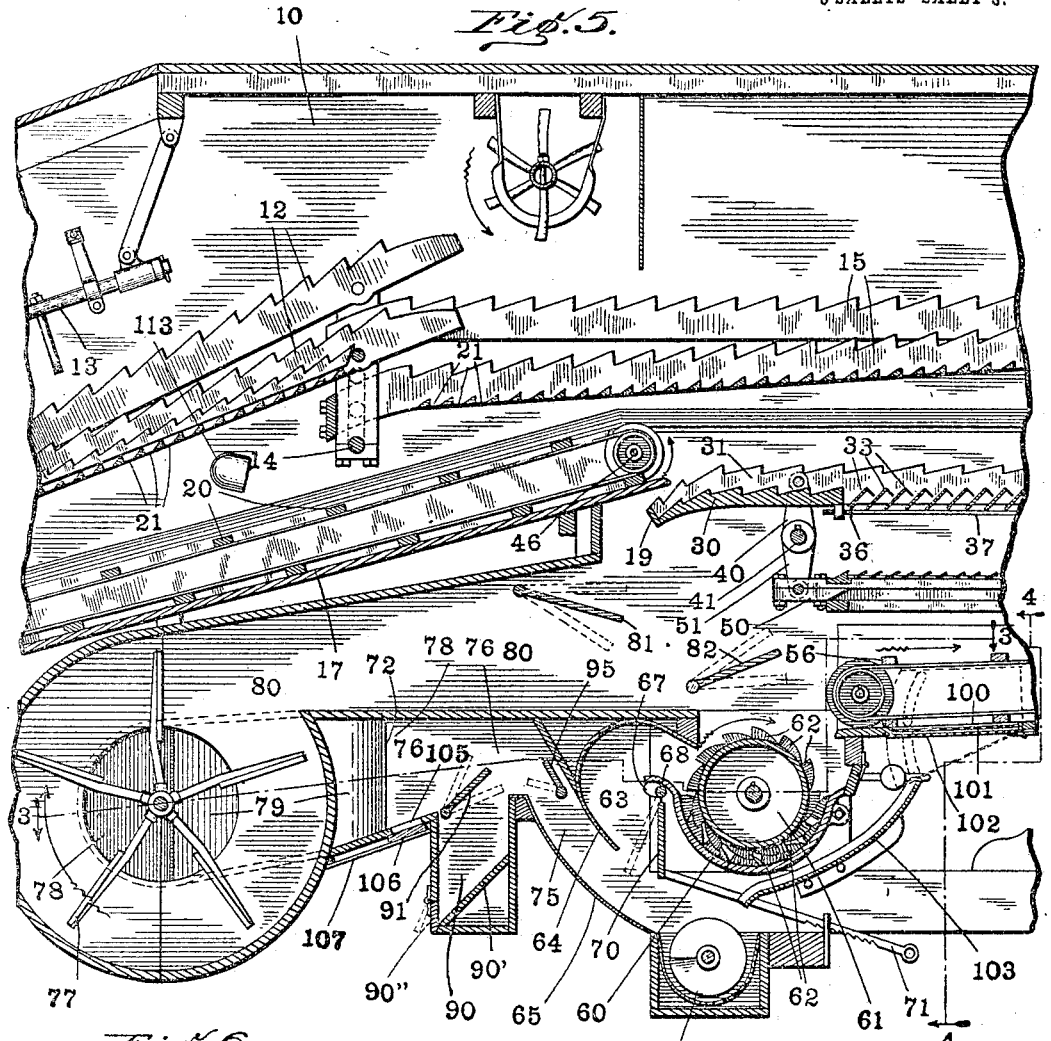
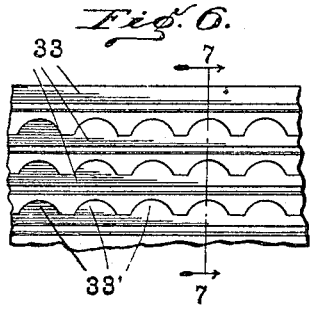
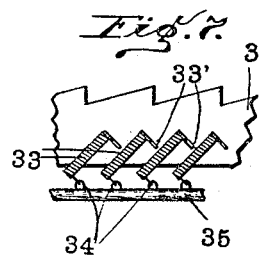
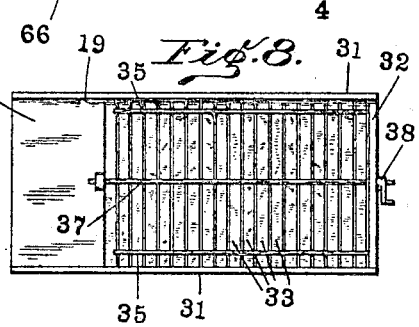
Inventor
Peter E. Good
By
Bradford & Hood
Attorneys
Witnesses
Frank A. Fahle
J. A. Walon ically between the sides 31 and fill-

UNITED STATES PATENT OFFICE.

PETER E. GOOD, OF ETNA GREEN, INDIANA.

THRESHING-MACHINE.

No. 798,956. Specification of Letters Patent. Patented Sept. 5, 1905.

Application filed January 21, 1905. Serial No. 242,158.

*To all whom it may concern:*

Be it known that I, PETER E. GOOD, a citizen of the United States, residing at Etna Green, in the county of Kosciusko and State of Indiana, have invented certain new and useful Improvements in Threshing-Machines, of which the following is a specification.

The object of my invention is to produce improved means for thoroughly cleaning and separating grain, the construction being such as to be readily adjustable for different kinds and conditions of the grain.

The accompanying drawings illustrate my invention.

Figure 1:
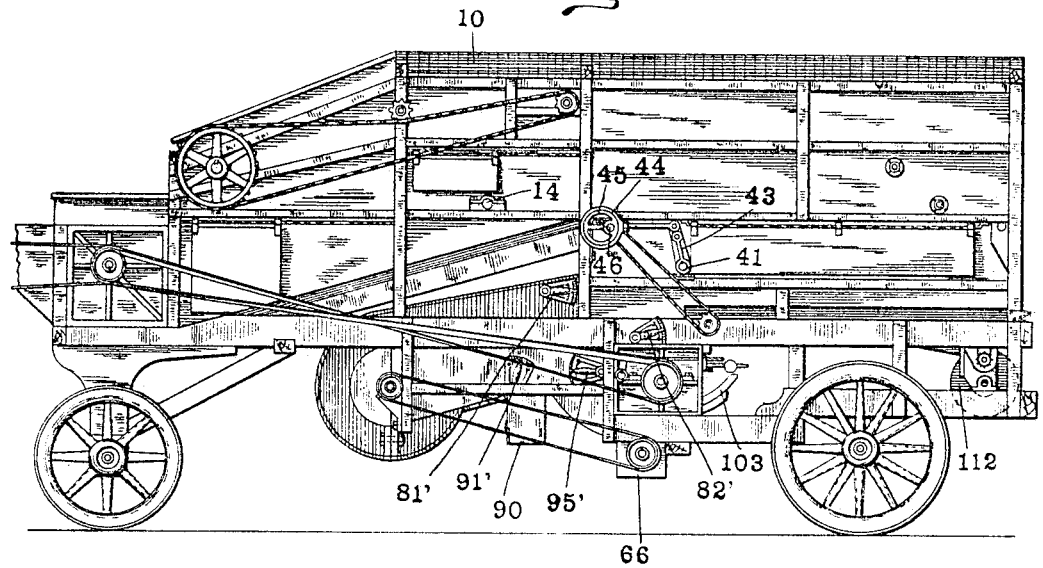
Figure 2:
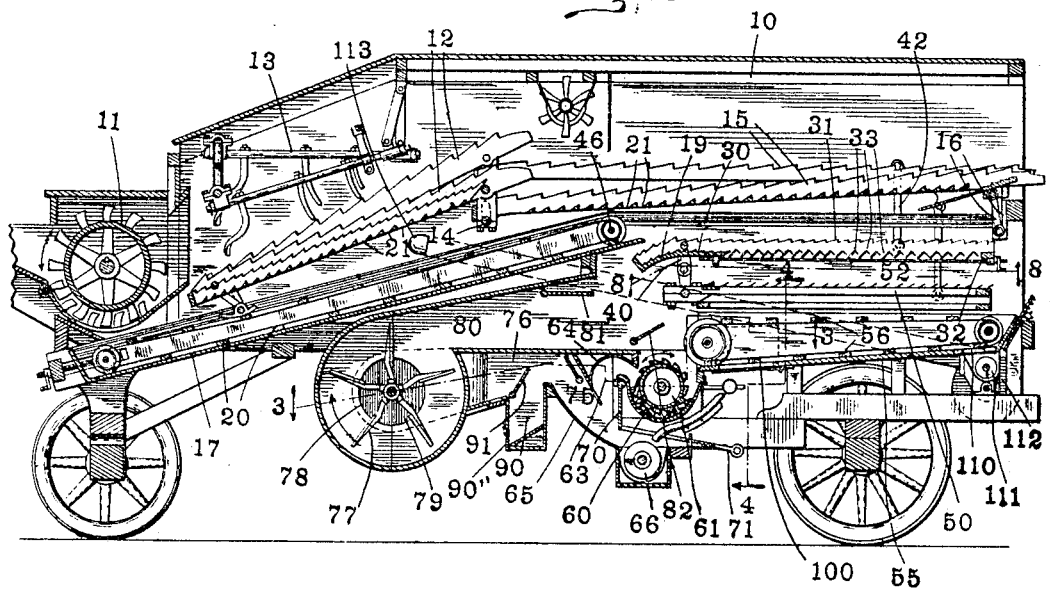

Figure 1 is a side elevation of a machine embodying my invention. Fig. 2 is a vertical section to one side of the center; Fig. 3, a horizontal section, on an enlarged scale, on line 3 3 of Figs. 2 and 5; Fig. 4, a section, on an enlarged scale, on line 4 4 of Figs. 2 and 5; Fig. 5, a section on line 5 5 of Figs. 3 and 4; Fig. 6, a detail of the shutter-screen; Fig. 7, a detail on line 7 7 of Fig. 6, and Fig. 8 an under plan on line 8 8 of Fig. 2.

In the drawings, 10 indicates the main casing, in the forward end of which is mounted a suitable threshing concave and drum 11. The straw and coarse material from this drum are delivered by it rearward to rearwardly and upwardly inclined separating rake-bar structures, over which is arranged a spreading mechanism 13, which forms the subject-matter of a companion application. The rake-bar structures 12 at their rear ends are carried by a crank-shaft 14, which crank-shaft also carries the forward ends of a pair of rake-bar structures 15, which extend rearward and are supported at their rear ends upon links 16. The finer material from the cylinder and concave is delivered through the concave upon a floor 17, which extends rearwardly and upwardly and discharges upon a screen structure 19, the fine stuff being moved upward and rearward along the bottom 17 by means of a raddle structure 20. The rake-bar structures 12 and 15 are provided with serrated perforated bottoms 21, through which the finer stuff falls either to the floor 17 or directly upon the shutter-screen 19. Thus far the structure may be of any desired form.

The shutter-screen 19 is provided at its forward end with a serrated bottom 30. This bottom 30 lies between a pair of sides 31, the upper edges of which are serrated, and these sides extend rearward and are connected at their rear ends by a cross-bar 32. Extending transversely between the sides 31 and filling the space between the rear edge of the bottom 30 and the cross-bar 32 is a plurality of L-shaped shutters 33, the under edges of which are connected by suitable eyes 34 with a bar 35, which extends longitudinally of the structure. In practice I find it desirable to provide two of the bars 35, one at each side of the structure. The base of the L of each shutter 33 extends to the shank of the shutter immediately to the rear and is scalloped, as at 33', along its outer edge, thus forming a series of openings through which the finer material may readily pass. In order to adjust these shutters angularly, the forward shutter is provided with a finger 36, which is attached to a longitudinal rod 37, extended through the cross-bar 32 and provided with a threaded outer end upon which is threaded a nut 38, by means of which the rod 37 may be adjusted longitudinally.

The forward end of the shutter-screen is carried upon a pair of arms 40, (only one of which is shown,) carried by a rock-shaft 41, while the rear end of the shutter-screen is supported by a pair of swinging links 42, (only one being shown.) The rock-shaft 41 is provided at one end with an arm 43, which arm is connected by an eccentric-strap 44 with an eccentric 45, carried by the rear shaft 46 of the raddle 20. Arranged beneath the shutter-screen 19 is a shaking-screen 50 of any desired type, said screen being supported at its forward end by arms 51, (only one being shown,) depending from shaft 41 and at the rear end being supported upon links 52. The grain which passes through the lower screen of the screen 50 drops upon the forwardly and downwardly inclined floor 55, down which it is carried by means of a raddle 56. The floor 55 discharges into a concave 60, within which is mounted a rubbing-drum 61. The concave and drum are provided with rubbing-teeth 62, so that all of the grain is treated between these teeth and is discharged upward and forward over the free end of the concave into a downwardly and rearwardly inclined passage 63. The passage is formed by a U-shaped partition 64, the lower end of which inclines downwardly and rearwardly. Below the partition 64 is a bottom 65, which is also downwardly and rearwardly inclined and leads to a grain-conveyer 66, the arrangement being such that the grain falls through the gaps from the lower end of the partition 64 to the bottom 65 and flows from thence down to the conveyer. The concave 60 is pivotally supported at its rear edge and at its forward edge rests upon cams 67, carried by a shaft 68, which shaft is extended out through the casing and provided with an adjusting means 69, so that the distance between the concave and the rubbing-drum may be adjusted. Suspended from shaft 68 is a damper-board 70, which may be swung toward and from the lower end of partition 64 and held in any desired position of adjustment by means of a notched adjusting-bar 71. Leading upward and forward from the lower end of partition 64 is a chaff-passage 75, which is formed between the partition 64 and bottom 65, and this passage leads into an air-chamber 76, which communicates with the eyes of a fan 77, mounted beneath the bottom 17.

In order to properly distribute the effect of the fan throughout the chamber 76, I arrange in said chamber a pair of deflecting-partitions 72, one at each side of the chamber, with their inner ends beginning at points some distance toward the medial line. These partitions thus form at each end of the fan a pair of passages 78 and 79, the passages 79 leading from the middle of the air-chamber 76, while the passages 78 lead from the ends, thus insuring substantial uniformity of partial vacuum throughout the chamber 76. The fan discharges through a blast-passage 80, which lies above the chamber 76 and leads to the forward ends of the screens 19 and 50. In order to regulate the effect of the blast from the fan upon these two screens, I arrange in the passage 80 a pair of transverse angularly-adjustable dampers 81 and 82, which are provided with adjusting devices 81' and 82', respectively.

Arranged in the bottom of the air-chamber 76 is a depending tailings-pocket 90, the upper end of which is guarded by a damper 91, which is provided on the outside of the casing with an adjusting means 91', so that by varying the angle of this damper the amount of material deflected thereby into the pocket 90 may be determined according to conditions. The pocket 90 is provided with a downwardly-inclined bottom 90', which leads to a depending swinging door 90".

The point of entrance of passage 75 into the chamber 76 is guarded by a damper 95, which may be angularly adjusted by means of adjusting means 95'.

Some grain, such as oats and the like, do not need the treatment accomplished by the rubbing-drum 61, and therefore in order to permit such grain to reach the grain-conveyer 66 without passing through the rubbing-drum and concave I form in bottom 55, at its lower forward end, an opening 100, which is protected by a plurality of longitudinal bars 101. The opening 100 is normally closed by a door 102, provided with side flanges 102', (see Fig. 4,) the door being hinged at its rear end. When it is desired to have the grain avoid the rubbing-drum, the door 102 is dropped to the position shown in dotted lines in Fig. 5, with its lower forward end resting upon the rear upper end of a pan or bottom 103, which leads downward and forward beneath the concave 60 directly to the grain-conveyer 66.

The operation is as follows: The grain will reach the bottom 55 in the usual manner and be fed along said bottom by the raddle 56 to the rubbing-drum. Here it will be treated in such manner as to loosen all chaff which has not been theretofore loosened and will be discharged into the passage 63, falling from the end of the partition 64 onto the bottom 65. Here air will be drawn through the flowing stream of grain through the passage 75 to remove all chaff and light grain. The effect of the blast-fan on the grain at this point may be varied by an adjustment of the damper 70. The heavy good grain flows to the grain-conveyer 66, while the chaff and lighter grain is drawn upward through the passage 75. Here it is deflected by the damper 95 in such manner that the lighter material will be drawn over damper 91 and drawn into the fan, from whence it will be driven through the passage 80 out over the screens in the usual manner. The tailings, however, will fail to pass over the damper 91 and will be deflected by it downward and drop into the pocket 90. Here it will pile up until the weight is sufficient to force the door 90" to swing slightly outward, whereupon a continuous stream of tailings will flow from the pocket. The tailings which accumulate in the pocket 90 serve as a seal for the opening caused by the movement of the door 90", so that there can be no upward movement of air through the tailings-pocket. The grade of tailings may be determined by proper relative adjustment of the dampers 95 and 91.

If it is desired to supply the fan 77 with a partial supply of air which does not come through the passage 75, I form openings 105 in the bottom of chamber 76, between the fan and the pocket 90, and these openings may be controlled as to effective area by means of slide-boards 106, mounted in suitable guides 107 beneath the bottom chamber 76.

In order to take care of the tailings from the end of screen 50, I form an opening 110 at the rear end of the bottom 55, and this opening leads to a transverse auger 111, which leads to a fan 112. The casing of this fan is provided with a discharge-pipe 113, which leads forward alongside of the main casing and then in transversely, so as to discharge toward the rear, as shown in Fig. 2, upon the floor 17.

I claim as my invention—

1. In a threshing-machine, the combination, with threshing and separating means, of a passage arranged to receive the grain from the final separating device said passage having a gap through which the grain falls, an air-passage leading from said gap to a blast device, the blast device, a tailings-receiver communicating with said passage, and deflecting means arranged in said air-passage to control the passage of material therethrough and to separate the tailings from the chaff and deflect said tailings into said pocket.

2. In a threshing-machine, the combination, with threshing and separating means capable of removing the bulk of chaff from the grain, of a rubbing-cylinder concave arranged to receive the grain from the separating devices, a grain-passage leading from said cylinder and concave and having a gap through which the grain falls, an air-passage leading from said gap to a blast-producing device, said blast-producing device, a tailings-pocket communicating with the bottom of said air-passage, and deflecting means for controlling the passage of air through the air-passage and for separating tailings from the chaff and deflecting them into said pocket.

3. In a threshing-machine, the combination, with threshing and separating means capable of removing the bulk of chaff from the grain, of a rubbing-cylinder concave arranged to receive the grain from the separating devices, a grain-passage leading from said cylinder and concave and having a gap through which the grain falls, an air-passage leading from said gap to a blast-producing device, said blast-producing device, a tailings-pocket communicating with the bottom of said air-passage, and adjustable deflecting means for controlling the passage of air through the air-passage and for separating tailings from the chaff and deflecting them into said pocket.

4. In a threshing-machine, the combination, with threshing and separating means capable of removing the bulk of chaff from the grain, of a rubbing-cylinder concave arranged to receive the grain from the separating devices, a grain-passage leading from said cylinder and concave and having a gap through which the grain falls, an air-passage leading from said gap to a blast-producing device, said blast-producing device, a tailings-pocket communicating with the bottom of said air-passage, deflecting means for controlling the passage of air through the air-passage and for separating tailings from the chaff and deflecting them into said pocket, and a door normally closing a discharge-opening of the tailings-pocket and yieldingly held in closed position, for the purpose set forth.

5. In a threshing-machine, the combination, with threshing and separating means capable of removing the bulk of chaff from the grain, of a rubbing-cylinder concave arranged to receive the grain from the separating devices, a grain-passage leading from said cylinder and concave and having a gap through which the grain falls, an air-passage leading from said gap to a blast-producing device, said blast-producing device, a tailings-pocket communicating with the bottom of said air-passage, adjustable deflecting means for controlling the passage of air through the air-passage and for separating tailings from the chaff and deflecting them into said pocket, and a door normally closing a discharge-opening of the tailings-pocket and yieldingly held in closed position, for the purpose set forth.

6. In a threshing-machine, the combination, with threshing and separating means capable of removing the bulk of chaff from the grain, of a rubbing-cylinder and concave arranged to receive the grain from the separating devices, a grain-passage leading from said cylinder and concave and having a gap through which the grain falls, an air-passage leading from said gap to a blast-producing device, said blast-producing device, a tailings-pocket communicating with the bottom of said air-passage, deflecting means for controlling the passage of air and for separating tailings from the chaff and deflecting them into said pocket, a grain-passage arranged around the rubbing-cylinder and concave, and adjustable means for delivering the grain to said passage instead of to the rubbing-cylinder and concave.

7. In a threshing-machine, the combination, with separating means, of a grain-passage arranged to receive the grain from said separating means and having a gap through which the grain falls, an air-passage leading from said gap to the eye of a fan-casing, the said fan-casing and fan mounted therein, and partitions arranged in the air-passage to form a plurality of air-passages leading from different points in the main air-passage to the fan-eye.

8. In a threshing-machine, the combination, with separating means, of a grain-passage arranged to receive the grain from said separating means and having a gap through which the grain falls, an air-passage leading over said gap to the eyes of the fan-casing, the said fan-casing and fan mounted therein, and partitions arranged in the air-passage to form a plurality of air-passages leading from different points in the main air-passage to each of the fan-eyes.

In witness whereof I have hereunto set my hand and seal, at Etna Green, Indiana, this 31st day of December, A. D. 1904.

PETER E. GOOD. [L. S.]

Witnesses:
 BERT CLAYCOMB,
 HENRY W. ROCKHILL.